(12) United States Patent
Lai

(10) Patent No.: US 9,746,887 B2
(45) Date of Patent: Aug. 29, 2017

(54) ELECTRONIC DEVICE BRACKET

(71) Applicant: Wistron Corporation, New Taipei (TW)

(72) Inventor: Yung-Cheng Lai, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 15/069,972

(22) Filed: Mar. 15, 2016

(65) Prior Publication Data

US 2017/0212559 A1 Jul. 27, 2017

(30) Foreign Application Priority Data

Jan. 22, 2016 (TW) .............................. 105102025 A

(51) Int. Cl.
*G06F 1/18* (2006.01)
*G11B 33/12* (2006.01)

(52) U.S. Cl.
CPC .............. *G06F 1/187* (2013.01); *G06F 1/183* (2013.01); *G11B 33/123* (2013.01); *G11B 33/124* (2013.01)

(58) Field of Classification Search
CPC ..... G11B 33/123; G11B 33/124; G06F 1/183; G06F 1/187
USPC ............ 361/379.31, 379.33, 379.37, 379.39; 312/223.2; 248/27.1, 27.3, 674, 678, 248/274.1, 299.1, 346.01, 346.03, 346.06, 248/346.07, 316.4, 277.1, 282.1
See application file for complete search history.

(56) References Cited

U.S. PATENT DOCUMENTS

| | | | | |
|---|---|---|---|---|
| 3,094,258 A * | 6/1963 | Punke | ................... | A47G 19/08 211/71.01 |
| 5,457,745 A * | 10/1995 | Wang | ................. | B60R 11/0241 379/426 |
| 5,694,468 A * | 12/1997 | Hsu | ..................... | B60R 11/0241 379/426 |
| 5,903,645 A * | 5/1999 | Tsay | .................... | B60R 11/0241 248/316.4 |
| 6,256,387 B1 * | 7/2001 | Wang | ..................... | H04M 1/04 379/446 |
| 6,285,758 B1 * | 9/2001 | Lu | ....................... | B60R 11/0241 379/446 |
| 6,351,378 B1 * | 2/2002 | Chao | ...................... | G06F 1/184 312/332.1 |
| 6,944,294 B2 * | 9/2005 | Tsay | ................... | B60R 11/0241 379/446 |
| 7,839,118 B2 * | 11/2010 | Carnevali | ............. | G06F 1/1632 320/107 |

(Continued)

*Primary Examiner* — Stanton L Krycinski
*Assistant Examiner* — Guang H Guan
(74) *Attorney, Agent, or Firm* — Jianq Chyun IP Office

(57) ABSTRACT

An electronic device bracket including a first supporting member, a second supporting member, and at least one pivoting member is provided. The second supporting member is disposed beside the first supporting member. The at least one pivoting member is disposed at a side of the first and the second supporting members, and two ends of the at least one pivoting member are pivoted to the first and the second supporting members. Here the first supporting member is adapted to move between a first position and a second position relative to the second supporting member, so as to adjust a length of the electronic device bracket.

4 Claims, 9 Drawing Sheets

(56) References Cited

U.S. PATENT DOCUMENTS

| | | | | |
|---|---|---|---|---|
| 7,967,269 | B2* | 6/2011 | Liu | F16M 13/02 |
| | | | | 248/176.3 |
| 8,118,272 | B2* | 2/2012 | Liou | F16M 13/02 |
| | | | | 248/176.3 |
| 8,320,118 | B2* | 11/2012 | Chuang | G11B 33/124 |
| | | | | 211/26 |
| 2011/0020044 | A1* | 1/2011 | Yu | B41J 3/4075 |
| | | | | 400/613 |
| 2012/0091304 | A1* | 4/2012 | Chuang | F16B 2/10 |
| | | | | 248/316.5 |
| 2012/0280101 | A1* | 11/2012 | Bouverie | F16B 2/12 |
| | | | | 248/316.4 |
| 2013/0083471 | A1* | 4/2013 | Zhou | G11B 33/124 |
| | | | | 361/679.31 |
| 2015/0051736 | A1* | 2/2015 | Mu | B25J 13/06 |
| | | | | 700/264 |

* cited by examiner

ELECTRONIC DEVICE BRACKET

CROSS-REFERENCE TO RELATED APPLICATION

This application claims the priority benefit of Taiwan application serial no. 105102025, filed on Jan. 22, 2016. The entirety of the above-mentioned patent application is hereby incorporated by reference herein and made a part of this specification.

BACKGROUND OF THE INVENTION

Field of the Invention

The invention relates to a bracket; more particularly, the invention relates to an electronic device bracket.

Description of Related Art

As cases of different computer systems may have different internal configurations, length requirements for electronic device brackets disposed in cases also differ. In general, to adapt to different length requirements for electronic device brackets, different modules need to be developed. However, as the cost of manufacturing mold is high, it is difficult to keep the manufacturing cost low. In addition, different part numbers are required for parts management, making management more complicated.

SUMMARY OF THE INVENTION

Accordingly, the invention provides an electronic device bracket with adjustable length to meet different length requirements and has lower manufacturing cost and management cost.

The electronic device bracket includes a first supporting member, a second supporting member, and at least one pivoting member. The second supporting member is disposed beside the first support member. The pivoting member is disposed at a side of the first supporting member and the second supporting member, and two ends of the pivoting member are pivoted to the first supporting member and the second supporting member, respectively. Here, the first supporting member is adapted to move between a first position and a second position relative to the second supporting member, so as to change the length of the electronic device bracket.

In an embodiment of the invention, the above described first supporting member includes a first bottom plate and two first side plates. The first bottom plate includes a first recess and a second recess located at two relative sides. The two first side plates are connected to a portion of the first bottom plate other than the first recess and the second recess located at two relative sides.

In an embodiment, the above described second supporting member includes a second bottom plate. The first bottom plate and the second bottom plate are located on a same surface, and the second bottom plate includes a first portion having a shape corresponding to the first recess.

In an embodiment, the above described second supporting member includes a second portion separate from the first portion, and the distance between the first portion and the second portion is greater than the narrowest width of the first bottom plate.

In an embodiment of the invention, the above described second supporting member includes two side plates respectively connected to the first portion and the second portion. When the first supporting member is at a first position or a second position relative to the second supporting member, here a first side plate and a second side plate are on a same surface, and the other first side plate and the other second side plate are on a same surface.

In an embodiment, the above described each of the first side plate includes at least a first fixing portion, each of the second side plates include at least a second fixing portion, and an electronic device is adapted to be fixed to the electronic device bracket through the first and second fixing portions.

In an embodiment, each of the above described first side plate includes a second fixing portion, each second side plate includes two second fixing portions, and when the first supporting member is located at a first position relative to the second supporting member, a distance between the first fixing portion and one of the second fixing portions located on a same surface is equal to a distance between the first fixing portion and the other second fixing portion when the first supporting member is at the second position relative to the second supporting member.

In an embodiment, at least one pivoting member described above includes three pivoting members arranged in parallel. The central pivoting member is disposed at a side of the first bottom plate and the second bottom plate, and the two pivoting members located at two sides of the center pivoting member are disposed at the other side of the first bottom plate and the second bottom plate.

In an embodiment, the above described first bottom plate includes a first contact surface. The second bottom plate includes a second contact surface facing the first contact surface. When the first supporting member is at a first position or a second position relative to the second supporting member, the first contact surface is in contact with the second contact surface.

In an embodiment, the above described electronic device bracket is a hard drive bracket, a CD-ROM bracket, an operation panel bracket, or an expansion card socket bracket.

Based on the above, the electronic device bracket through two ends of the pivoting member is respectively pivoted to the first supporting member and the second supporting member. The first supporting member moves between the first position and the second position relative to the second supporting member, such that the length of the electronic device bracket is adjustable. Accordingly, two lengths are provided. This way, only a single mold is needed to manufacture an electronic device bracket of two lengths, saving cost and making part management more convenient.

To make the aforementioned and other features and advantages of the invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
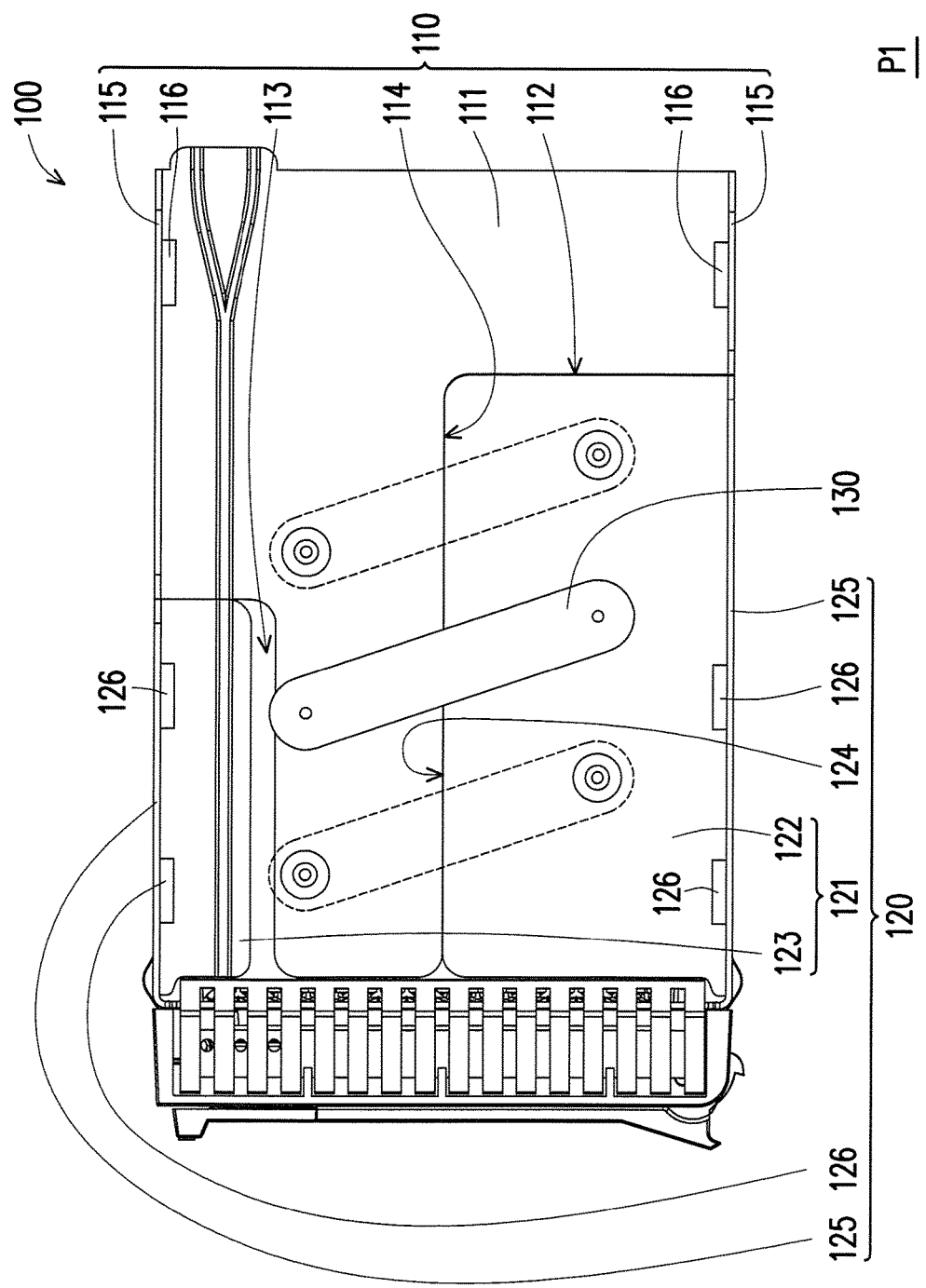
FIG. 1 is a schematic diagram illustrating a first supporting member of an electronic device bracket located in a first position according to an embodiment.

Reference will now be made in detail to the present preferred embodiments of the invention, instances of which are illustrated in the accompanying drawings. Wherever possible, the same reference numbers are used in the drawings and the description to refer to the same or like parts.

Figure 2:
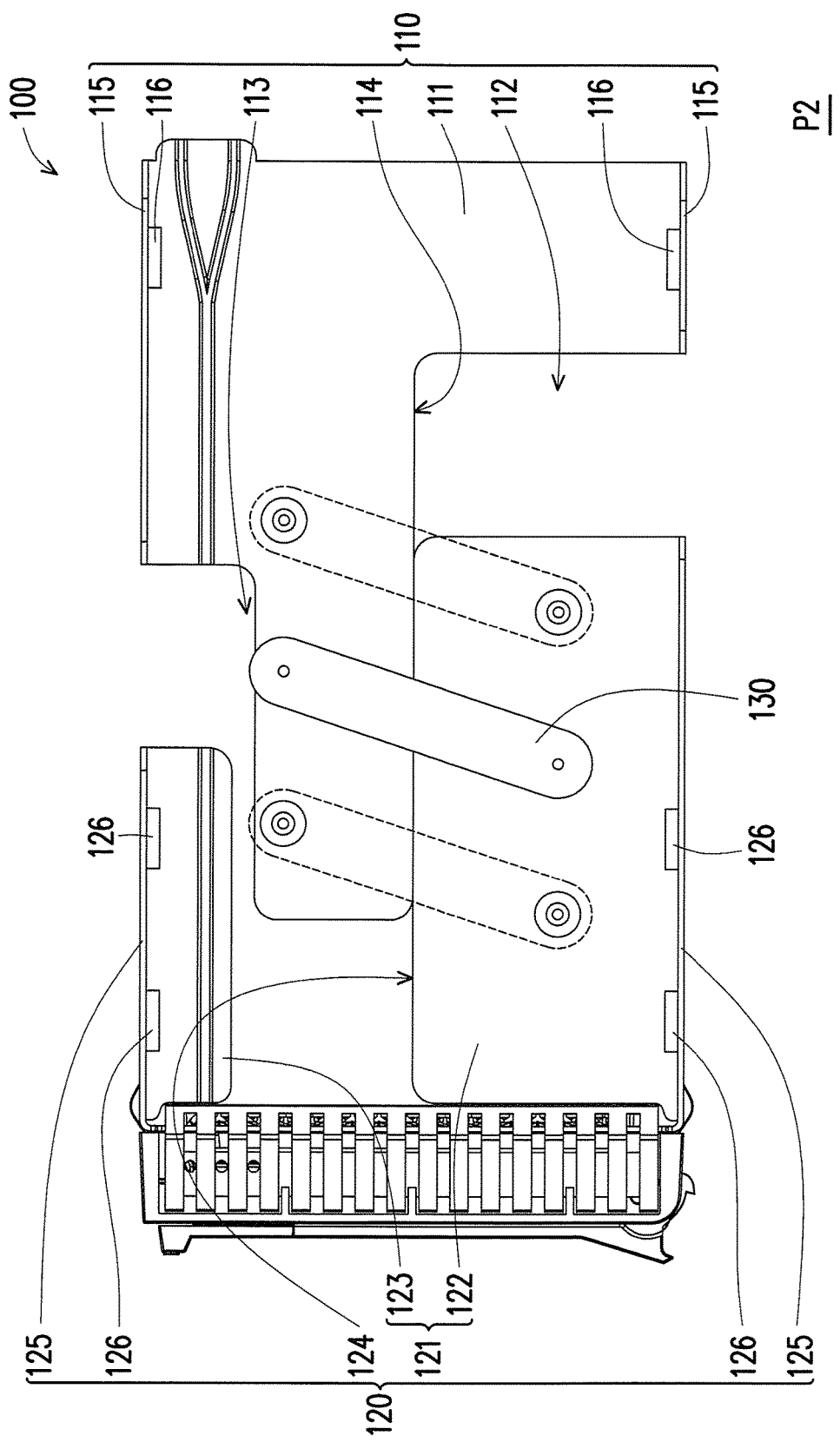
FIG. 2 is a schematic diagram of the first supporting member of the electronic device bracket located in a second position.

FIG. 1 is a schematic diagram illustrating a first supporting member of an electronic device bracket in a first position according to an embodiment. FIG. 2 is a schematic diagram of the first supporting member of the electronic device bracket in a second position. Referring to FIG. 1 and FIG. 2, the electronic device bracket 100 is capable of being fixed to a back panel 15 of a server (shown in FIG. 6). The electronic device bracket 100 has adjustable length to adapt to different requirements. The details are explained below.

Figure 3:
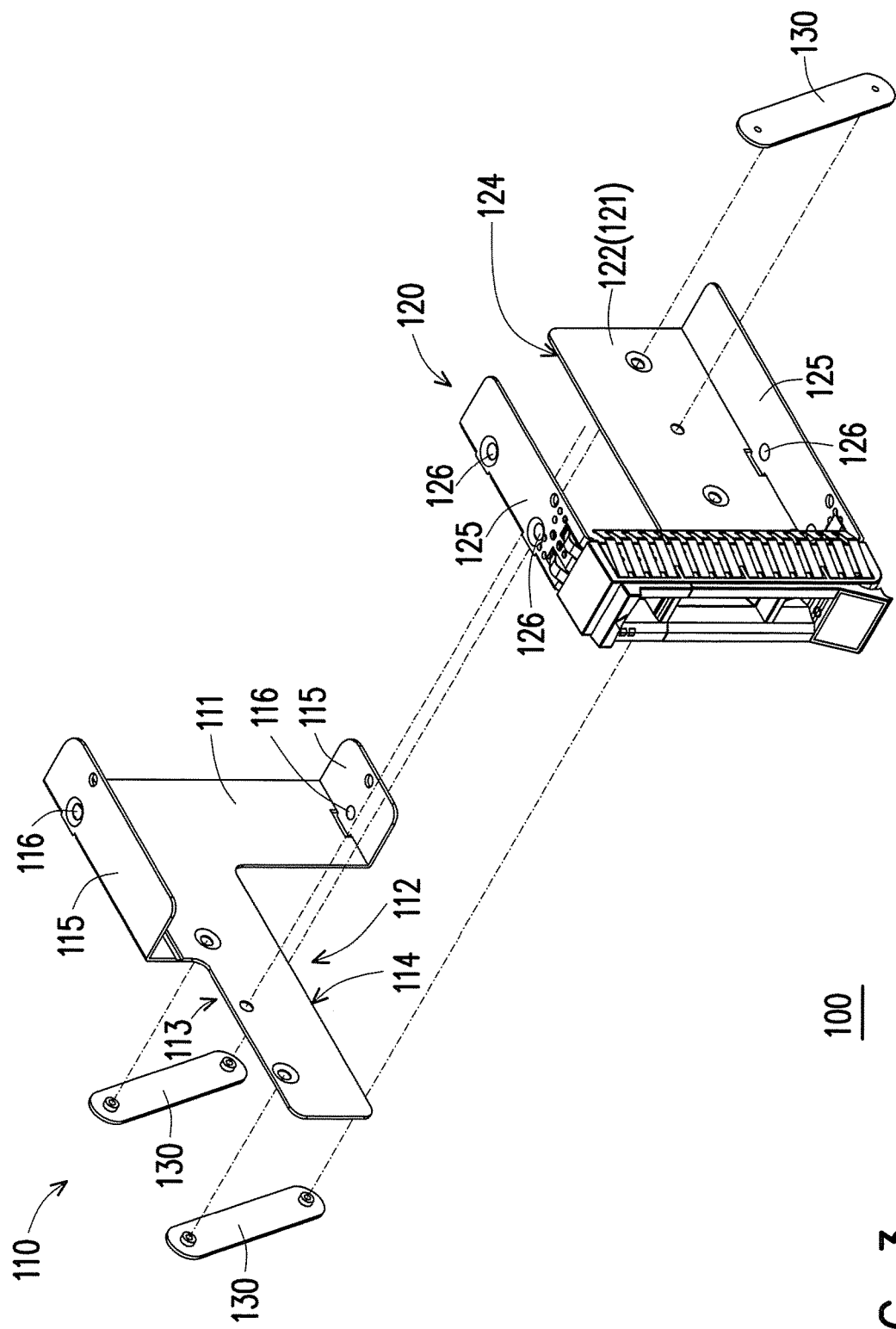
FIG. 3 is an exploded view of the electronic device bracket.

FIG. 3 is an exploded view of an electronic device bracket. Referring to FIGS. 1 to 3, the electronic device bracket 100 includes a first supporting member 110, a second supporting member 120, and at least one pivoting member 130.

The first supporting member 110 includes a first bottom plate 111 and two first side plates 115. The first bottom plate 111 includes a first recess 112 and a second recess 113 located at two relative sides (located at a lower side and two upper sides of FIG. 1 and FIG. 2). In the present embodiment, the first recess 112 is located at a lower left side of the first bottom plate 111, and the second recess 113 is located at an upper left side of the first bottom plate 111, such that width of the left portion of the first bottom plate 111 is less than that of the right portion. The two first side plates 115 are respectively connected to a portion other than the first recess 112 and the second recess 113 of two relative sides of the first bottom plate 111 (i.e. the upper and lower sides in FIG. 1 and FIG. 2). In other words, the distance between the two first side plates 115 is substantially equal to the maximum width of the first bottom plate 111.

The second supporting member 120 is disposed beside the first support member 110. In the present embodiment, the second supporting member 120 includes a second bottom plate 121. The first bottom plate 111 and the second bottom plate 121 are located on a same surface, and the second bottom plate 121 includes a first portion 122 having a shape corresponding to the first recess 112 and a second portion 123 separated from the first portion 122. A left portion of the first bottom plate 111 is extended into a space between the first portion 122 and the second portion 123 of the second bottom plate 121, and a distance between the first portion 122 and the second portion 123 is greater than a narrowest width of the first bottom plate 111.

The first bottom plate 111 also includes a first contact surface 114. The second bottom plate 121 also includes a second contact surface 124 facing the first contact surface 114. When the first supporting member 110 is in a first position P1 as shown in FIG. 1, or a second position P2 as shown in FIG. 2, relative to the second supporting member 120, the first contact surface 114 is in contact with the second contact surface 124. Accordingly, when the first supporting member 110 is at a first position P1 as shown in FIG. 1 or a second position P2 relative to the second supporting member 120 as shown in FIG. 2, a distance exists between the left portion of the first bottom plate 111 and the second portion 123 of the second bottom plate 121.

Figure 4:
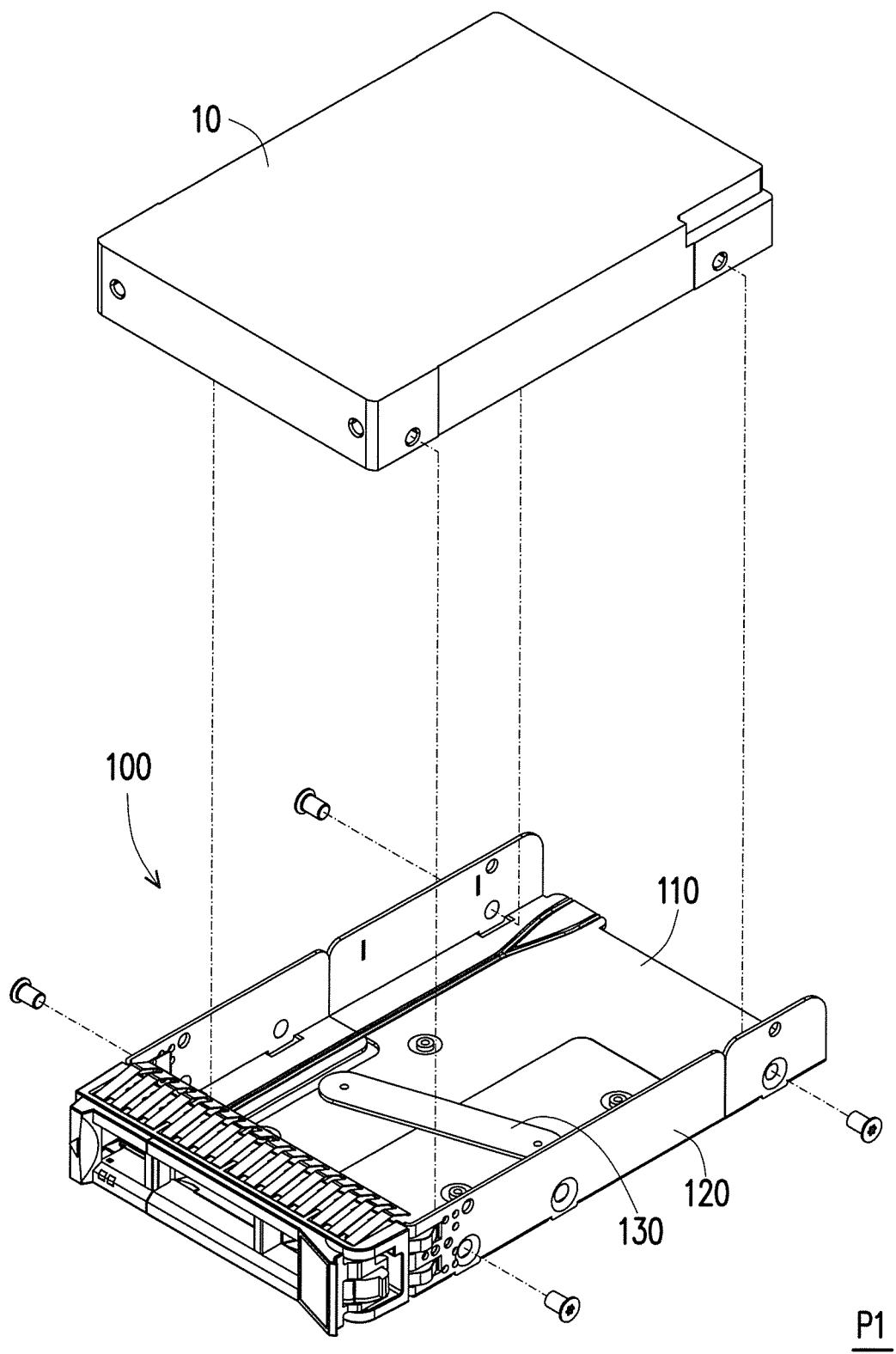
FIG. 4 is a schematic diagram of an assembly of an electronic device and a first supporting member of an electronic device bracket located in a first position.

In addition, the second supporting member 120 includes two side plates 125 respectively connected to the first portion 122 and the second portion 123. When the first supporting member 110 is at the first position P1 or the second position P2 relative to the second supporting member 120, one of the first side plates 115 and one of the second side plates 125 are on a same surface, and the other first side plate 115 and the other second side plate 125 are located on a same surface. Accordingly, the first supporting member 110 and the second supporting member 120 together form a tray structure to support and accommodate an electronic device 10 (as shown in FIG. 4).

Note that although in the present embodiment the shapes and sizes of the two first side plates 115 are different, and the shapes and sizes of the second side plates 125 are also different, in another embodiment, the two first side plates 115 can be the same shape and size, and the two second side plates 125 can be the same shape and size.

The pivoting member 130 is disposed at a side of the first supporting member 110 and the second supporting member 120, and two ends of each pivoting member 130 is pivoted to the first supporting member 110 and the second supporting member 120. In the present embodiment, the pivoting member 130 is pivoted to the first supporting member 110 and the second supporting member 120 through rivet bonding, but the method for pivoting the pivoting member 130 to the supporting member 110 and the second supporting member 120 are not particularly limited thereto. Furthermore, in the present embodiment, the electronic device bracket 100 includes three pivoting members 130 arranged in parallel. The central pivoting member 130 is disposed at a side of the first bottom plate 111 and the second bottom plate 121 (e.g. an upper surface), and the two pivoting members 130 located on two sides of the central pivoting member 130 are disposed at another side of the first bottom plate 111 and the second bottom plate 121 (e.g. an lower surface).

In the present embodiment, since the first supporting member 110 and the second supporting member 120 of the electronic device bracket 100 are movably connected through the pivoting member 130, the first supporting member 110 is adapted to move between a first position P1 (FIG. 1) and a second position P2 (FIG. 2) relative to the second supporting member 120, such that the length of the electronic device bracket 100 is adjustable to meet more diverse user requirements. For instance, the electronic device bracket 100 accommodates electronic devices of different lengths. In the alternative, the electronic device bracket 100 accommodates electronic devices of a same length in different positions.

Note that while the pivoting member 130 pivots, the track in which the first supporting member 110 moves is an arc.

The space between the left portion of the first bottom plate 111 and the second portion 123 of the second bottom plate 121 is used to provide a moving path for the first bottom plate 111 while the first pivoting member 110 is in motion, so as to avoid the first bottom plate 111 being stuck by the second bottom plate 121 and become unable to move while the first supporting member 110 is in motion.

Figure 5:
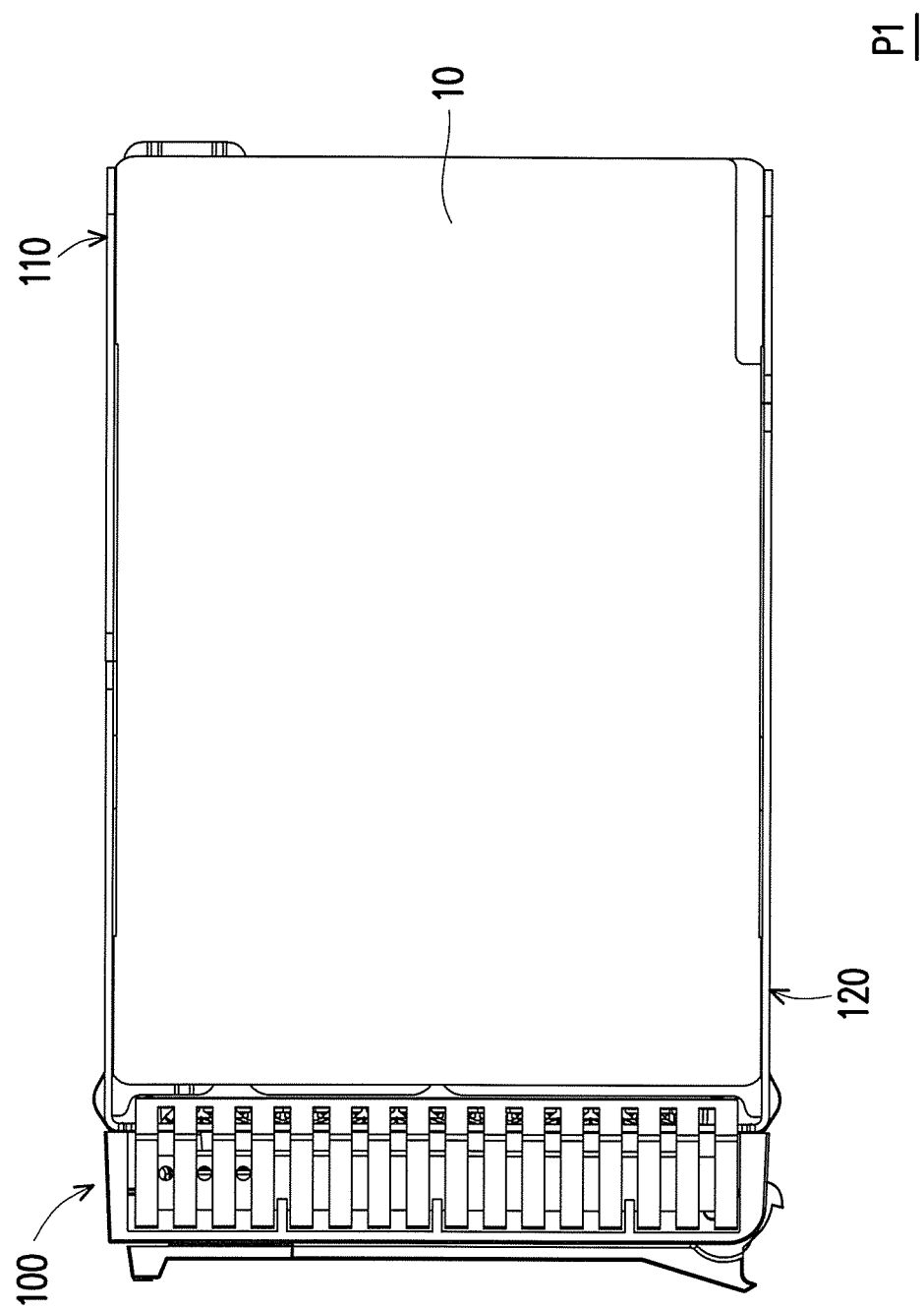
FIG. 5 is a schematic diagram of an electronic device assembled to the electronic device bracket of FIG. 4.
Figure 6:
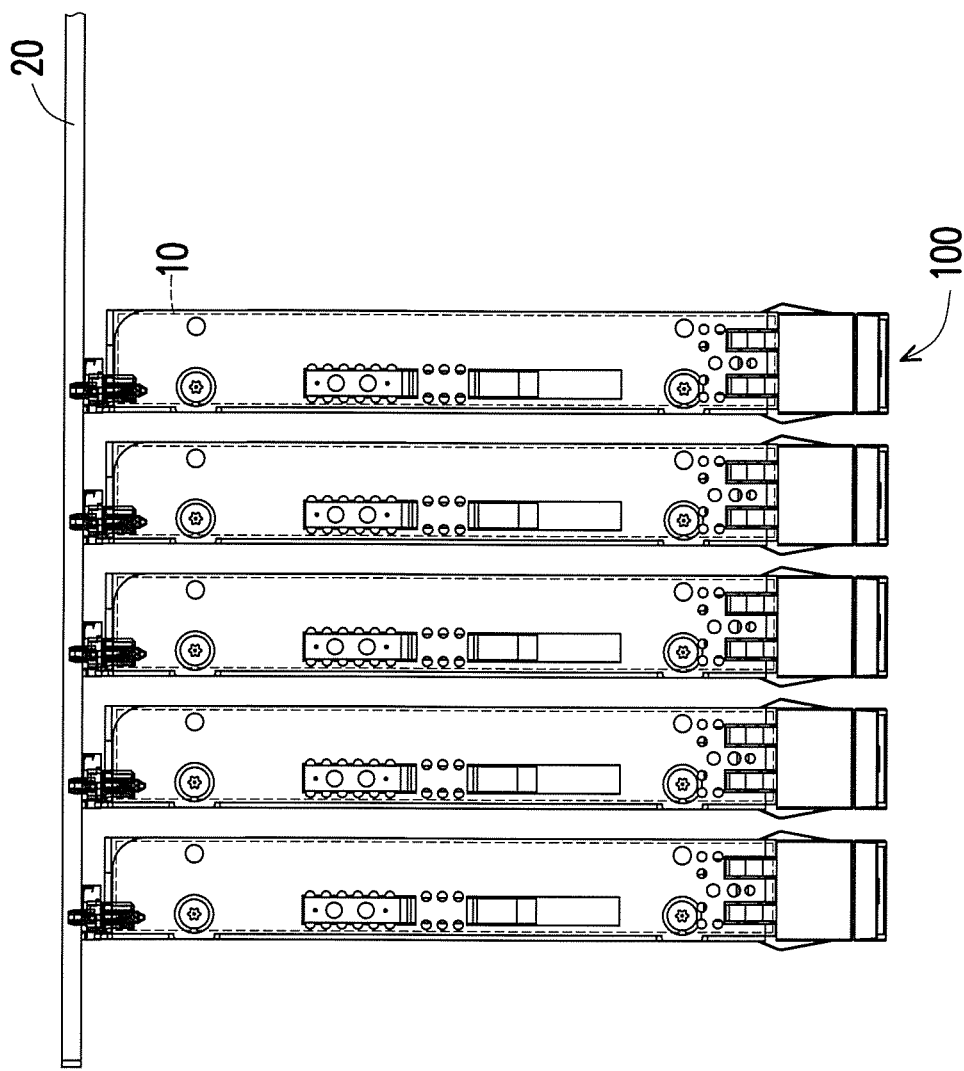
FIG. 6 is a schematic diagram illustrating an electronic device and the electronic device bracket of FIG. 5 disposed inside a case.
Figure 7:
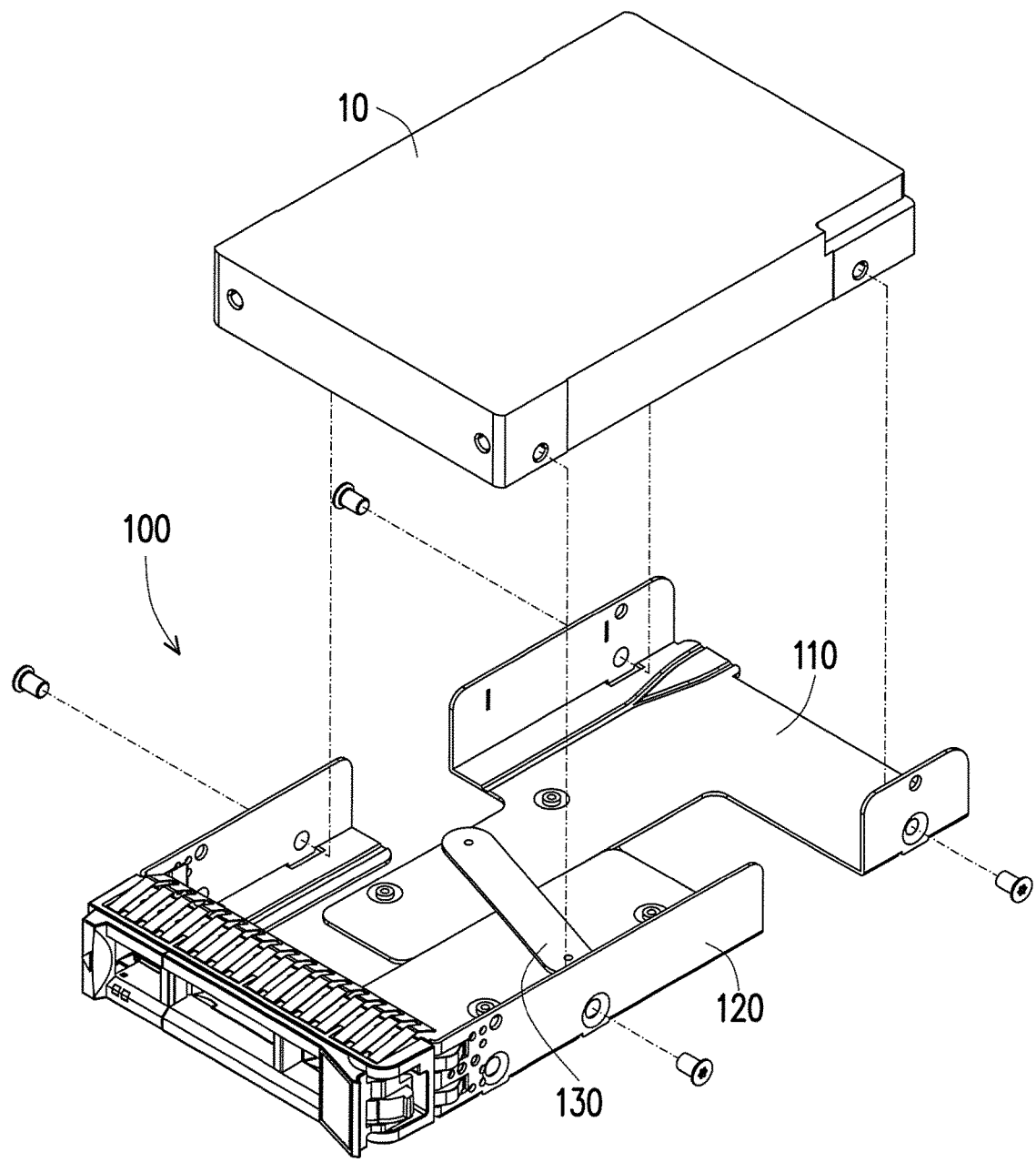
FIG. 7 is a schematic diagram of an assembly of an electronic device and a first supporting member of the electronic device bracket located in a second position.
Figure 8:
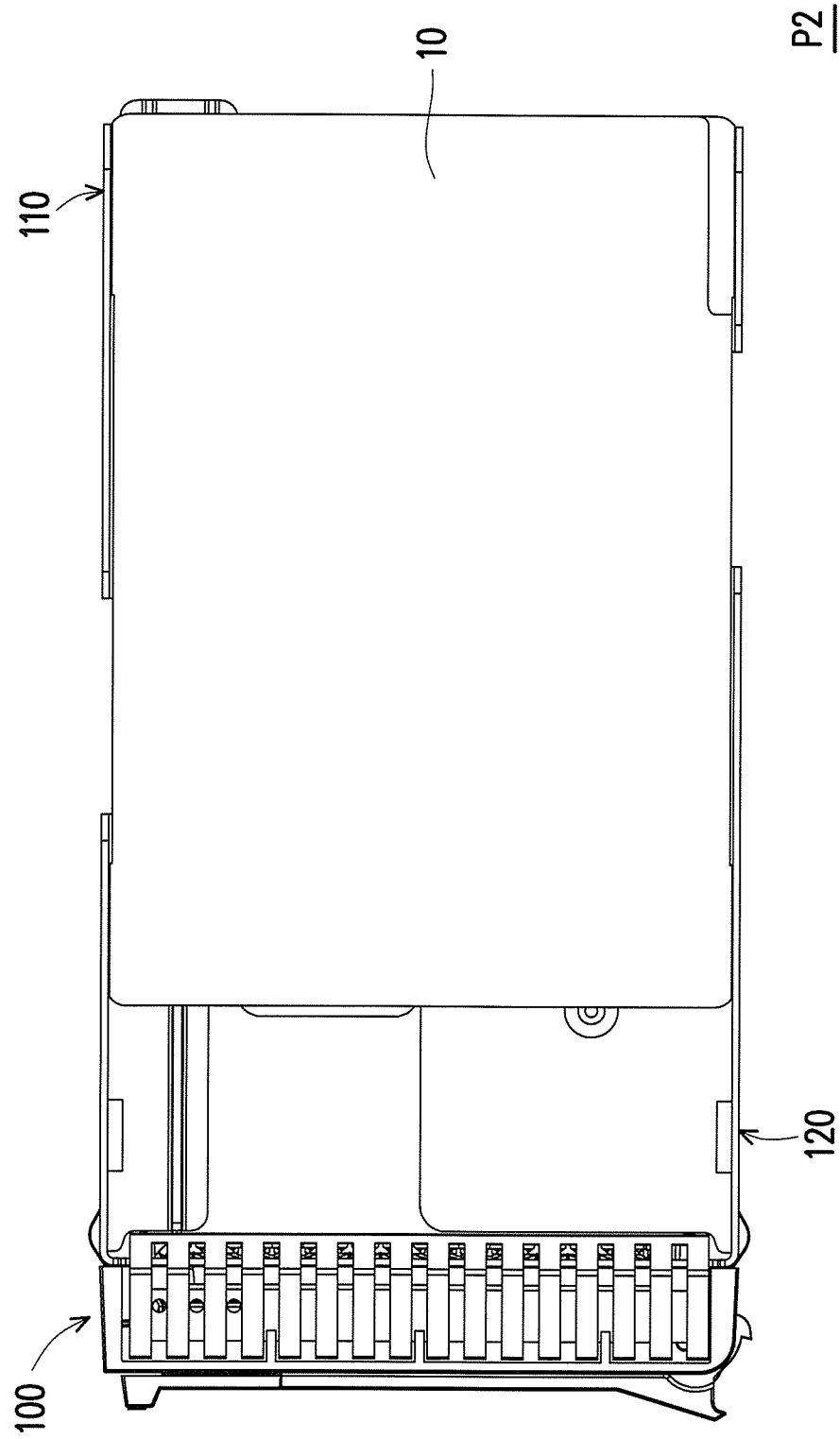
FIG. 8 is a schematic diagram of an electronic device assembled to the electronic device bracket of FIG. 7.
Figure 9:
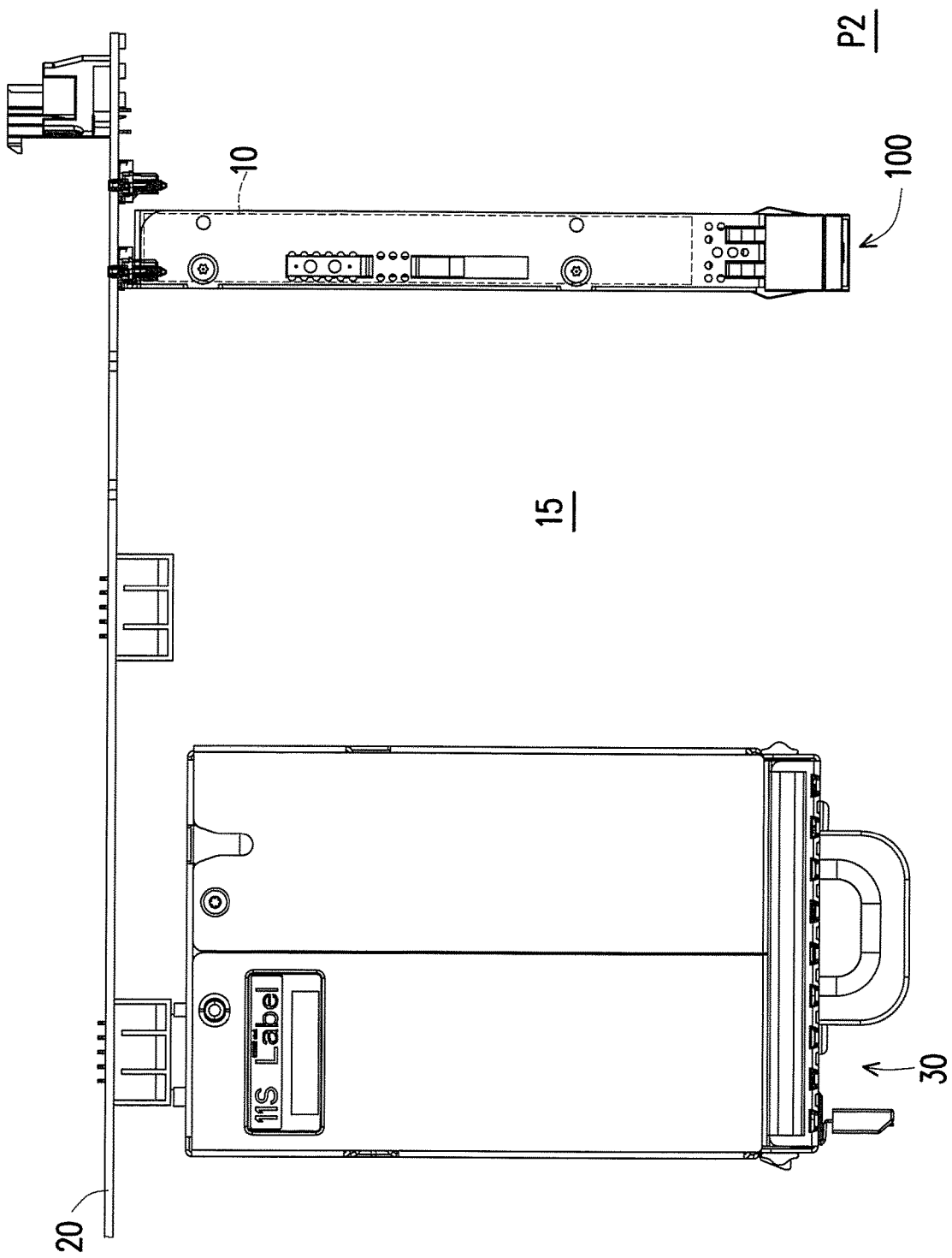
FIG. 9 is a schematic diagram illustrating an electronic device and the electronic device bracket of FIG. 8 disposed inside a case.

FIG. 4 is a schematic diagram of an assembly of an electronic device and a first supporting member of an electronic device bracket located in a first position. FIG. 5 is a schematic diagram of an electronic device assembled to the electronic device bracket of FIG. 4. FIG. 6 is a schematic diagram illustrating an electronic device and the electronic device bracket of FIG. 5 disposed inside a case. FIG. 7 is a schematic diagram of an assembly of an electronic device and a first supporting member of the electronic device bracket located in a second position. FIG. 8 is a schematic diagram of an electronic device assembled to the electronic device bracket of FIG. 7. FIG. 9 is a schematic diagram illustrating an electronic device and the electronic device bracket of FIG. 8 disposed inside a case.

Referring to FIGS. 3 to 9. In the present embodiment, the electronic device bracket 100 is a hard drive bracket used to support an electronic device 10 such as a hard drive. But in another embodiment, the electronic device bracket 100 can be a CD ROM bracket, an operation panel bracket, or an expansion card socket bracket. The electronic device bracket 100 and the supported type of electronic device 10 are not particularly limited thereto.

Each first side plate 115 includes at least one first fixing portion 116. Each second side plate 125 includes at least one second fixing portion 126. The electronic device 10 is adapted to be fixed to the electronic device bracket 100 by passing screws through the first fixing portions 116 and the second fixing portions 126. More particularly, in the present embodiment, each first side plate 115 includes a second fixing portion 116 and each second side plate 125 includes two second fixing portions 126.

Since in the present embodiment, the location of the screw holes on the electronic device 10 are the same, in order to fix the electronic device 10 to different locations of the electronic device bracket 100. In the present embodiment as shown in FIG. 4, when the first supporting member 110 is in a first position P1 relative to the second supporting member 120, a distance between the first fixing portion 116 and one of the second fixing portions 126 is the same as the distance between the first fixing portion 116 and the other of the second fixing portions 126 when the first supporting member 110 is located at a second position P2 relative to the second supporting member 120 as shown in FIG. 7, so as fix to the electronic device 10 by passing the screws through the first fixing portion 116 and one of the second fixing portions 126 of the electronic device bracket 100.

Of course, in another embodiment, each first side plate 115 of the electronic device bracket 100 can also include two fixing portions 116 and each second side plate 125 can also include a second fixing portion 126. When the first supporting member 110 is in the first position P1 relative to the second supporting member 120, the distance between one of the first fixing portion 116 and the second fixing portions 126 is the same as the distance between the other first fixing portion 116 and the second fixing portions 126 when the first supporting member 110 is located at a second position P2 relative to the second supporting member 120, so as fix to allow the user to fix the electronic device 10 to different locations of the electronic device bracket 100.

As shown in FIG. 6, in the case, the plurality of electronic devices 10 with the electronic device brackets 100 are disposed in a case 15 of an electronic system (e.g. a server, not specifically labeled) and fixed on a back plate 20 to reduce the room taken up by the electronic devices 10 and the electronic device brackets 100 in the case 15, the first supporting members 110 of the electronic device brackets 100 can take a form of shorter length at the first position P2. Conversely, as shown in FIG. 9, if the location of the electronic device 10 of the electronic system is to correspond to other electronic device 30, e.g. a fan, then a form of longer length may be taken through moving the first supporting member 110 of the electronic device bracket 100 to a second position P2, and dispose the electronic device 10 to the electronic device bracket 100, to bring the length of the electronic device 10 together with the electronic device bracket 100 closer to the length of the other electronic device 30.

As described above, the electronic device bracket through two ends of the pivoting member is pivoted to the first supporting member and the second supporting member. The first supporting member moves between the first position and the second position relative to the second supporting member, such that the length of the electronic device bracket is adjustable, and two lengths are provided. This way, only a single mold is needed to manufacture an electronic device bracket of two lengths, saving cost and making part management more convenient.

Even though the invention is disclosed through the embodiments as above, the embodiments are not used to limit this invention, and any person with ordinary skill in the art, without deviating from the teachings and scope of this invention, may make adjustments and refinements; therefore, the scope of protection of this patent is defined as following claims.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:
1. An electronic device bracket, comprising:
a first supporting member, wherein the first supporting member comprises a first bottom plate and two first side plates, the first bottom plate comprises a first recess and a second recess located at two opposing sides, the two first side plates are connected to a portion of the first bottom plate other than the first recess and the second recess at the two opposing sides;
a second supporting member disposed beside the first supporting member, wherein the second supporting member comprises a second bottom plate, the first bottom plate and the second bottom plate are located on a first same plane, the second bottom plate comprises a first portion having a shape corresponding to the first recess, a second portion separate from the first portion, a distance between the first portion and the second portion is greater than a narrowest width of the first bottom plate, two second side plates respectively connected to the first portion and the second portion, and when the first supporting member is at a first position or a second position relative to the second supporting member, one of the first side plates and one of the second side plates are located on a second same plane, and the other first side plate and the other second side plate are located on a third same plane;

wherein each of the first side plates comprises one first fixing portion, each of the second side plates comprises two second fixing portions, and when the first supporting member is at the first position relative to the second supporting member, a distance between the first fixing portion located on the second same plane and one of the second fixing portions located on the second same plane is equal to a distance between the first fixing portion located on the second same plane and the other of the second fixing portions located on the second same plane when the first supporting member is at the second position relative to the second supporting member, and the electronic device bracket is adapted for supporting an electronic device through the first fixing portions and through the second fixing portions; and at least one pivoting member, wherein each of the at least one pivoting member is disposed at a side of each of the first and the second supporting members, and two ends of each of the at least one pivoting member are respectively pivotally attached to the first and the second supporting members, wherein the first supporting member is adapted to move between the first position and the second position relative to the second supporting member, so as to adjust a length of the electronic device bracket.

2. The electronic device bracket of claim 1, wherein the at least one pivoting member comprises three pivoting members arranged in parallel, a first of the three pivoting members is disposed on a side of the first bottom plate and a second bottom plate, and the second and a third of the three pivoting members located at two sides of the first of the three pivoting members are disposed on the other side of the first bottom plate and the second bottom plate.

3. The electronic device bracket of claim 1, wherein the first bottom plate comprises a first contact surface, the second bottom plate comprises a second contact surface facing the first contact surface, and when the first supporting member is located at the first position or the second position relative to the second supporting member, the first contact surface is in contact with the second contact surface.

4. The electronic device bracket of claim 1, wherein the electronic device bracket is a hard drive bracket, a CD-ROM bracket, an operation panel bracket, or an expansion card socket bracket.

* * * * *